United States Patent [19]
Jensen

[11] Patent Number: 5,601,632
[45] Date of Patent: Feb. 11, 1997

[54] METHOD AND AN APPARATUS FOR THE PURIFICATION OF RESIDUAL PRODUCTS FROM FLUE GAS PURIFICATION PLANTS

[75] Inventor: Bjarne H. Jensen, Valby, Denmark

[73] Assignee: Fls Miljø A/S, Denmark

[21] Appl. No.: 492,851

[22] Filed: Jun. 20, 1995

[51] Int. Cl.$^6$ .................. C22B 3/02; C22B 3/04
[52] U.S. Cl. ............... 75/743; 75/961; 266/146; 95/186; 95/188
[58] Field of Search ............ 75/743, 961; 266/146, 266/147; 95/186, 188

[56] References Cited

U.S. PATENT DOCUMENTS

| | | |
|---|---|---|
| 4,234,429 | 11/1980 | Rhodes et al. |
| 5,039,498 | 8/1991 | Vicard. |
| 5,082,493 | 1/1992 | Barrett et al. ............... 75/743 |

FOREIGN PATENT DOCUMENTS

| | | |
|---|---|---|
| 162194 | 12/1984 | Denmark. |
| 3320466 | 12/1984 | Germany. |
| 4123258 | 1/1993 | Germany. |

Primary Examiner—Melvyn Andrews
Attorney, Agent, or Firm—Brumbaugh, Graves Donohue & Raymond

[57] ABSTRACT

A method and an apparatus for the purification of residual products from flue gas purification plants.

Between a wet-desulphurization plant (1) for flue gas and an associated waste water-treatment plant (2) for the purification of the water used in the wet-desulphurization there is inserted a leaching apparatus (3, 7, 4) for the purification of hazardous residual products supplied through a conduit (6) from flue gas purification in dry-and and semidry-desulphurization plants by means of waste water supplied through a conduit (5) from the plant (1). The hazardous residual products supplied through the conduit (6) are admixed with the waste water supplied through the conduit (5) in a container (3) whereupon the mixture is conveyed to a filtration step (4) wherein the soluble salts and leachable heavy metals are separated from the filter cake produced and said filtrate being, through a conduit (8) conveyed to the waste water-treatment plant (2) whereas the leached out filter cake, now in the form of a waste dump-safe residual product, is conveyed to a deposit site through a conduit (9).

10 Claims, 2 Drawing Sheets

METHOD AND AN APPARATUS FOR THE PURIFICATION OF RESIDUAL PRODUCTS FROM FLUE GAS PURIFICATION PLANTS

BACKGROUND OF THE INVENTION

The invention relates to a method and an apparatus for the purification of a hazardous residual product from the process carried out in a flue gas purification plant for acid gas purification to obtain a waste dump-safe residual product by use of water, preferably waste water from wet-desulphurization plants. The water is subjected to aftertreatment in a waste water-treatment plant.

Environmental requirements that combustion smoke from industrial plants, e.g. waste combustion plants, be purified of acid components before the smoke is released into the atmosphere, are now so widespread that flue gas purification plants which comply with such requirements are commonly used in many countries.

The most widely used state of the art plants are based on the use of calcium as acid neutralizer, calcium in the form of a wet or a dry reactant being added to the flue gas in the plant. The calcium reacts with the flue gas to form reaction products in the form of soluble salts, such as $CaCl_2$, and non-soluble salts, such as $CaSO_3$ and $CaSO_4$, which are subsequently removed from the plant as a residual product in the form of a sludge or a powder. At the same time the desulphurized flue gas is released into the atmosphere.

Such flue gas purification plants may be divided into three main categories, as disclosed in e.g. U.S. Pat. No. 4197278, viz.

wet-process plants in which the flue gas is 'scrubbed' in an aqueous suspension or solution of calcium and which produces a harmless sludge-like residual product, $CaSO_4.2H_2O$ (wet gypsum) and waste water, dry-process plants in which the flue gas is treated with a dry absorbing agent (calcium) and from which the reaction products are extracted as a hazardous, dry powder containing HCl and HF, and semi-dry-process plants in which the reactant is supplied in the form of an aqueous solution, the water, however, being caused to evaporate during the process so as to extract, in this plant too, the residual product in the form of a hazardous, dry powder.

So far wet-process plants have been preferred for flue gas purification because the most effective desulphurization of the treated flue gas is obtained therein with limited use of calcium, also in case of a high $SO_x$-content. The inconveniences associated with the wet-method are the formation of a wet residual product, the use of large amounts of fresh water for the 'scrubbing' proper in the plant, and the formation of an amount of waste water which is to be aftertreated for the sake of the environment.

In dry-process- and semidry-process plants the $SO_x$-removal from the flue gas is less effective than in wet-process plants. On the other hand there is no waste water problem associated with such plants and the residual product, dry powder, is easier to handle, whereas it is an inconvenience that the soluble salts formed in the processes of such plants by deposition of residual products are leached out so that depositing can only be performed on particularly suitable locations.

The large consumption of water in wet-process plants is due to the technical requirement that the salts removed from the flue gas should be washed away for final discharge into streams or sea areas. However, the salt concentration proper of the waste water produced is considerably lower than required with due regard to the recipient, e.g. a sea area. Prior to discharge, the waste water should receive final treatment in a waste water-treatment plant coupled after the flue gas purification plant. Among other things, the acid-content of the water should be neutralized, e.g. by addition of calcium during the treatment process.

Thus, with its salt subsaturation and a low pH prior to its treatment in the waste-water plant, the waste water represents per se a resource which has not been utilized so far and which may be rendered useful for the conditioning of waste dump-hazardous residual products from flue gas purification plants into waste dump-safe residual products, as the soluble salts and the leachable heavy metals are leached out of the hazardous residual products by means of the waste water.

DE-A-3320466 discloses a method of cleaning flue gas where two subsequent steps are used for cleaning the same flue gas stream. However, this prior art publication does not suggest the cleaning of a residual product from one process by use of the residual product from another process.

SUMMARY OF THE INVENTION

Therefore, it is the object of the invention to provide a method and an apparatus for the utilization of the waste water resulting from a wet-process flue gas-purification plant in the treatment of hazardous residual products from flue gas purification before such waste water is further treated in a waste water-treatment plant.

Thus, the method according to the invention provides not only yet another useful utilization of the water amount which is supplied to a wet-desulphurization plant prior to the final discharge of that water amount as waste water. The waste water is also utilized to condition the hazardous residual products in the form of sludge or dry powder by leaching out soluble salts and heavy metals therefrom so that, following such treatment, residual products are produced which are waste dump-safe with bound salts and heavy metals thus allowing the residual products to be deposited in specially designed deposits without ensuing risks to the environment, e.g. in the form of hazardous leaks or precipitations.

Hence, such leaching out of soluble, harzardous substances present in the residual products prior to depositing results in a highly increased degree of waste dump-safety and very reduced waste dump expenses and entail no significant additional costs to or any significant additional consumption of leaching water which is to be aftertreated in a waste water-treatment plant.

BRIEF DESCRIPTION OF THE DRAWINGS

The invention will now be explained in further detail with reference to the drawings which are schematical and non-limiting views of two embodiments of an apparatus according to the invention, and wherein.

DESCRIPTION OF THE PREFERRED EMBODIMENTS

Figure 1:
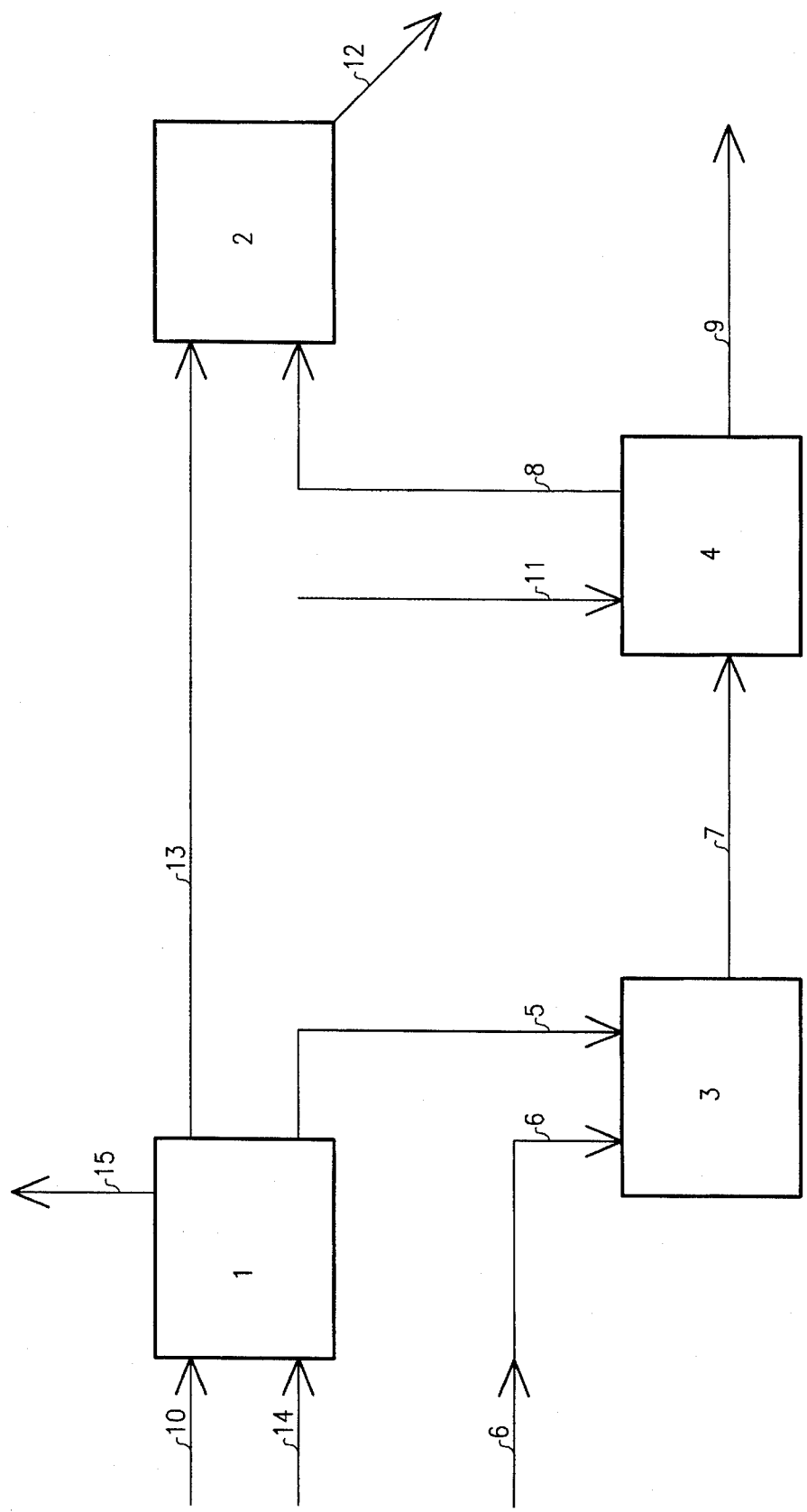
FIG. 1 shows an apparatus in which the admixture of waste water and residual products is effected in a separate container.

In both FIGS. 1 denotes a wet-desulphurization plant; 2 a waste water-treatment plant; 4 a filtration step, preferably a vacuum filter conveyor; 10 a supply conduit for flue gas to the desulphurization plant 1; 14 a supply conduit of an aqueous absorbant solution for the plant 1; and 15 a discharge conduit for desulphurized flue gas from the plant 1.

In FIG. 1 the salt-subsaturated waste water from the purification process in the plant 1 is passed through a conduit 5 to a container 3. Through a conduit 6 the residual product from the flue gas purification is also conveyed to the container 3 for suspension or slurrying therein with the waste water. The residual product may be a powderous product which is supplied to the container 3 via a conduit 6 from a dry- or a semidry-process plant. The sludge-like mixture produced in the container 3 is conveyed through a conduit 7 to a filtration step 4 wherein the water and the salts dissolved therein as well as leachable heavy metals are separated from the residual product from the flue gas purification in the form of a filtrate while leaching of the filter cake produced and are conveyed to a waste water-treatment plant 2 via a conduit 8 for further treatment therein, e.g. for addition of an overdose of sulfide compounds to precipitate the additionally supplied heavy metals. Treated waste water is removed through an outlet 12. The filter cake precipitated and leached in the filtration 4 and the salts and heavy metals now bound therein are discharged through a conduit 9 for substantially safe depositing.

In case the amount of waste water from the wet-desulphurization plant 1 is not sufficiently large or in case the salt content thereof is not sufficiently low for the treatment in the filtration step 4 to be carried out, additional fresh water may be supplied in this step 4 through a conduit 11.

13 denotes the conduit used so far for waste water from the wet-desulphurization plant 1 directly to the waste water-treatment plant 2. This conduit 13 is used in case it is desired to disconnect the leaching apparatus according to the invention.

Figure 2:
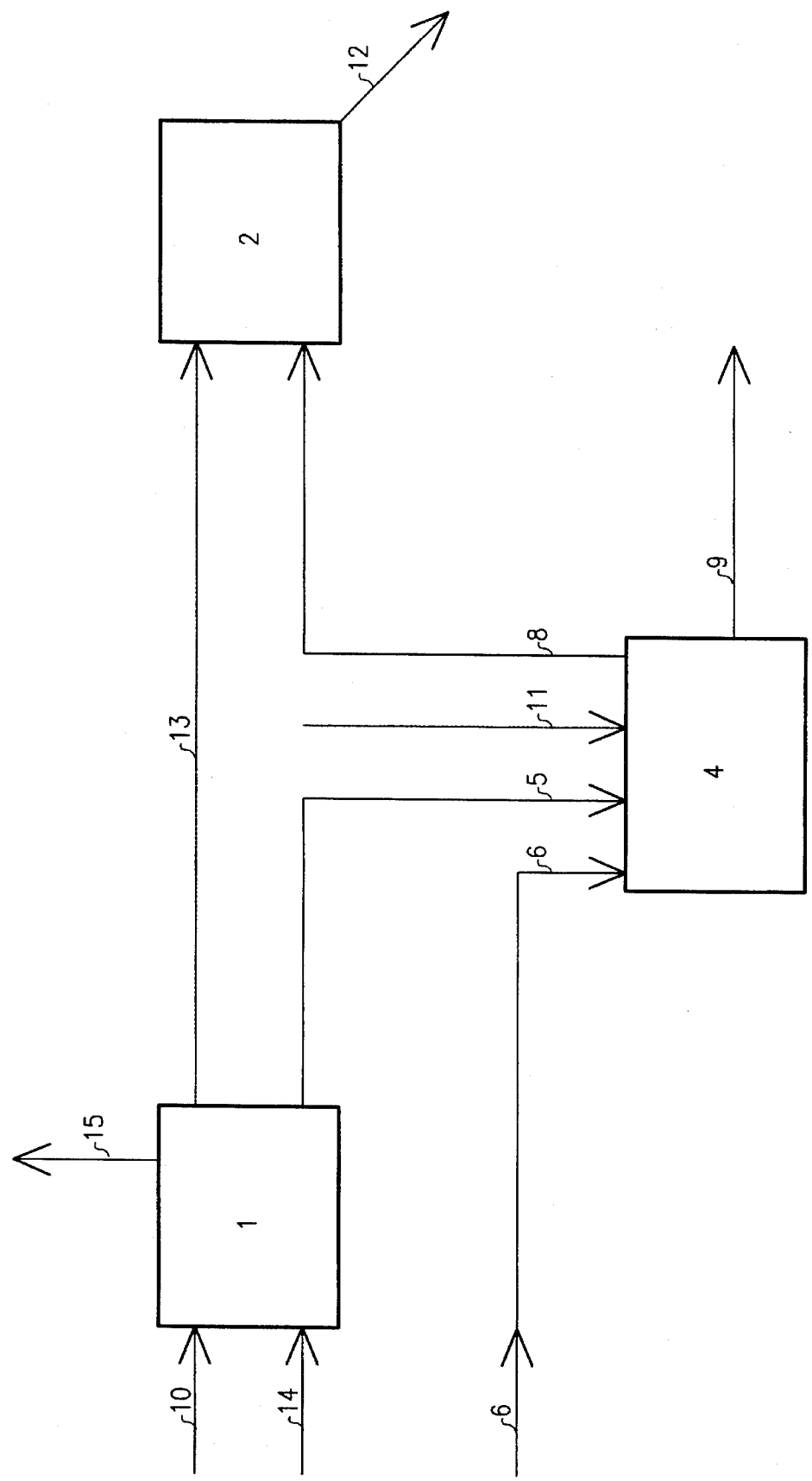
FIG. 2 shows an apparatus in which waste water and residual product is admixed in the filtration step of the apparatus.

The plant shown i FIG. 2 differs from the one shown i FIG. 1 in that the mixing container 3 and its conduit 7 to the filtration step are omitted so as to supply the residual product from the flue gas purification through the conduit 6 directly onto the filter conveyor in the step 4; and in that admixture is carried out with waste water supplied via the conduit 5 and optionally additionally supplied fresh water from the conduit 11. The remaining functions of the apparatus according to FIG. 2 correspond to the corresponding functions described in connection with FIG. 1.

Leaching out by means of the apparatus shown in FIG. 2 is particularly advantageous when the residual product from a semidry-process for flue gas purification is to be treated, as on the one hand this apparatus allows for further water economies and on the other hand it allows in particular utilization of the acidic properties of the waste water from the wet-desulphurization plant for the binding of heavy metals in the leached filter cake by pH-neutralizing the latter.

Such fixation of heavy metals is particularly relevant when, in a semidry-desulphurization plant, flue gas with a high content of HCl, HF and heavy metal compounds is treated, since a large calcium surplus is used in such flue gas purification process thereby providing an alcaline (basic) residual product from which heavy metals and soluble salts are leached out in the process according to the invention prior to the depositing of the residual product.

Leaching removes the soluble salts which carry the leachable heavy metals along whereas a pH-lowering of the filter cake binds the heavy metals which have not been leached out.

The contact between the alcaline residual product from the semidry-process and the waste water from a wet-process will thus cause the soluble salts and leachable heavy metals to move from the 'semidry' residual product into the waste water which is conveyed to the waste water plant, and hence to utilize the calcium surplus of the 'semidry' residual product to neutralize the waste water prior to its treatment in the waste water plant thereby reducing or eliminating the need to add a base during the treatment in the waste water plant proper for the neutralization of the acidic waste water from the wet-desulphurization plant.

We claim:

1. A method for the removal of leachable soluble salts and leachable heavy metals from residual products from dry- or semidry-processes for the purification of flue gas comprising the steps of using salt-containing but salt-subsaturated waste water from wet-process flue gas purification plant as leaching water, forming a suspension of the residual product in the leaching water, filtering the suspension in a filtration step while leaching out soluble salts and leachable heavy metals from the filter cake produced thereby producing a filtrate containing the salts and heavy metals, adding the filtrate and the salts and heavy metals dissolved therein to a waste water-treatment plant wherein the heavy metals are separated from the water, removing the leached residual product in the form of a filter cake containing bound salt residues and bound heavy metals as a dump-safe residual product.

2. A method according to claim 1, wherein additional fresh water is supplied to the filtration step on a filter conveyor to carry out the process.

3. A method according to any one of claims 1 or 2, wherein the binding of heavy metals in the leached filter cake is effected through a pH-reduction of the residual product when leached with salt-containing waste water from a wet-process flue gas purification plant, wherein the acid/base properties of the waste water are also neutralized.

4. A method according to any one of claims 1 or 2, wherein the residual product from dry- or semidry-processes for the purification of flue gas and salt-containing waste water from a wet-process flue gas purification plant is supplied directly to a filter conveyor in the filtration step.

5. An apparatus to carry out a method for the removal of leachable soluble salts and leachable heavy metals from residual products from dry- or semidry-process for the purification of flue gas, comprising means for supplying to a container salt-containing waste water from a wet-process flue gas purification plant and its associated waste water-treatment plant, and means for supplying to said container said residual product from a dry- or semidry process for the purification of flue gas, a container adapted to contain a suspension of the supplied residual product from a dry- or semidry-process for the purification of flue gas in the waste water from the wet-process plant; and a filtration means coupled to a suspension outlet of the container.

6. An apparatus according to claim 5, wherein only a filtration means is inserted between the flue gas purification plant and the waste water plant.

7. An apparatus according to any one of claims 5, 6, 8, 9 or 10 wherein the filtration means is also provided with an inlet for fresh water.

8. An apparatus according to claim 5, wherein the filtration means comprises a filter conveyor for the filtration of the suspension with an inlet and outtake/outlet for filtrate and leached filter cake.

9. An apparatus according to claim 8, wherein only a filtration means is inserted between the flue gas purification plant and the waste water plant.

10. An apparatus according to claim 6, wherein the filtration means comprises a filter conveyor with separate direct inlets for residual product and waste water.

\* \* \* \* \*